(12) United States Patent
Yin et al.

(10) Patent No.: US 9,823,095 B2
(45) Date of Patent: Nov. 21, 2017

(54) CONTACT LASER ENCODING ANTI-THEFT LOCK

(71) Applicants: Sihao Yin, Shanghai (CN); Menghui Jia, Shanghai (CN)

(72) Inventors: Sihao Yin, Shanghai (CN); Menghui Jia, Shanghai (CN)

( * ) Notice: Subject to any disclaimer, the term of this patent is extended or adjusted under 35 U.S.C. 154(b) by 0 days.

(21) Appl. No.: 14/946,058

(22) Filed: Nov. 19, 2015

(65) Prior Publication Data

US 2016/0202091 A1   Jul. 14, 2016

(30) Foreign Application Priority Data

Jan. 14, 2015   (CN) .......................... 2015 1 0018556

(51) Int. Cl.
*H04B 10/00*   (2013.01)
*E05B 65/00*   (2006.01)
(Continued)

(52) U.S. Cl.
CPC .......... *G01D 5/347* (2013.01); *E05B 47/0001* (2013.01); *E05B 47/0611* (2013.01);
(Continued)

(58) Field of Classification Search
USPC ....................................................... 398/127
See application file for complete search history.

(56) References Cited

U.S. PATENT DOCUMENTS 4,509,093 A * 4/1985 Stellberger .............. B60R 25/24
340/10.41
4,787,223 A * 11/1988 Gotanda ................. B60R 25/04
292/216

(Continued)

FOREIGN PATENT DOCUMENTS

| CN | 102968838 | 3/2013 |
| CN | 103559748 | 2/2014 |

OTHER PUBLICATIONS

Baker, Jacob R., CMOS: Circuit Design, Layout, and Simulation, 2010, IEEE, p. 529-531.*

(Continued)

*Primary Examiner* — Ken N Vanderpuye
*Assistant Examiner* — Jai Lee
(74) *Attorney, Agent, or Firm* — Loza & Loza, LLP; Michael Fedrick

(57) ABSTRACT

This invention provides a contact laser encoding anti-theft lock, comprising: a key for generating a set of light signals with different pulse repetition frequencies; a signal processing module for receiving a set of optical pulse signals, in which the optical signals are converted to a set of voltage signals at different voltage values, and for comparing the voltage signals with a predetermined voltage (the voltage signals within the predetermined voltage range can be output as usual otherwise the output voltage is set to be zero); an electrically controlled lock, for opening or locking anti-theft doors according to the output voltage from the signal processing module; and a power supply for the signal processing module and the electrically controlled lock. The contact laser encoding anti-theft lock of this invention shows higher security and duplication of the keys is more difficult compared with prior anti-theft locks.

10 Claims, 3 Drawing Sheets

(51) Int. Cl.
*G01D 5/347* (2006.01)
*E05B 47/00* (2006.01)
*E05B 47/06* (2006.01)
*E05B 49/00* (2006.01)
*G01D 5/36* (2006.01)
*G07C 9/00* (2006.01)
*H04B 10/11* (2013.01)
*H04B 10/112* (2013.01)

(52) U.S. Cl.
CPC ............... *E05B 49/00* (2013.01); *G01D 5/36* (2013.01); *G07C 9/00182* (2013.01); *E05B 2047/005* (2013.01); *E05B 2047/0067* (2013.01); *E05B 2047/0072* (2013.01); *G07C 2009/00634* (2013.01); *G07C 2009/00785* (2013.01); *H04B 10/11* (2013.01); *H04B 10/1121* (2013.01)

(56) References Cited

U.S. PATENT DOCUMENTS

| | | | | |
|---|---|---|---|---|
| 4,788,542 A * | 11/1988 | Tanabe | ............... | G07C 9/00182 307/10.2 |
| 5,543,665 A * | 8/1996 | Demarco | ............... | B60R 25/04 340/5.6 |
| 5,889,603 A * | 3/1999 | Roddy | ............... | B60R 25/04 340/5.64 |
| 5,898,397 A * | 4/1999 | Murray | ............... | G07C 9/00182 340/12.22 |
| 6,055,079 A * | 4/2000 | Hagans | ............... | B60R 25/00 307/10.1 |
| 6,441,936 B1 * | 8/2002 | Kinstler | ............... | H04B 10/11 398/106 |
| 7,546,038 B2 * | 6/2009 | Wang | ............... | H04B 10/1141 398/118 |
| 8,565,607 B2 * | 10/2013 | Kang | ............... | H04B 10/1149 398/128 |
| 2009/0214225 A1 * | 8/2009 | Nakagawa | ............... | H04B 10/1149 398/191 |
| 2010/0135671 A1 * | 6/2010 | Park | ............... | H04B 10/1141 398/172 |
| 2011/0038638 A1 * | 2/2011 | Son | ............... | H04B 10/116 398/130 |
| 2013/0335193 A1 * | 12/2013 | Hanson | ............... | H04W 12/06 340/5.61 |
| 2014/0197692 A1 * | 7/2014 | Chen | ............... | G07C 9/00174 307/104 |
| 2015/0101370 A1 * | 4/2015 | Russo | ............... | G07C 9/00309 70/263 |

OTHER PUBLICATIONS stackexcnage.com, Comparator using Logic Gates only-Electrical Engineering Stack Exchange, Nov. 13, 2011, http://electronics.stackexchange.com/questions/22187/comparator-using-logic-gates-only.*
Bhattacharya, S. K., Basic Electrical and Electronics Engineering, 2012, Pearson, pp. 644.*
Bali, S. P., Linear Integrated Circuits, 2008, Tata McGraw-Hill Publishing Company Limited, pp. 155-156.*
Office Action dated Jul. 5, 2016, Chinese Patent Application No. 201510018556.8.
Office Action dated , Chinese Patent Application No. 201510018556.8.

* cited by examiner (a)

(b)

CONTACT LASER ENCODING ANTI-THEFT LOCK

CROSS-REFERENCE TO RELATED APPLICATIONS

This application claims the benefit of priority under 35 U.S.C. §119 from Chinese Patent Application No. 201510018556.8, filed on Jan. 14, 2015. The disclosure of this application is incorporated herein by reference in its entirety.

FIELD OF THE INVENTION

This present invention relates to anti-theft locks, especially relates to one kind of contact laser encoding anti-theft lock of high security.

BACKGROUND

Currently, anti-theft locking devices used in anti-theft system can be generally classified as purely mechanical and electric anti-theft devices. Purely mechanical anti-theft devices achieve security purpose through their solid metal anti-theft devices and key devices and high geometric matching between the locks and keys. By complicated electric encoding and electric alarm systems, the electric anti-theft devices not only realize the anti-theft function as purely mechanical locks, but also the alarm and remote sensing functions which the mechanical ones cannot do.

Each of the two anti-theft devices mentioned above has its own advantages and disadvantages. A purely mechanical anti-theft lock is simple, but it is easy to be cracked, which drastically diminishes its ability to prevent theft. With the development of society, the style of mechanical locks is constantly changing but the principles remain the same. Every kind of mechanical locks has its own cracking method. Usually electric security locks have been encrypted when they are designed. A built-in encryption integrated circuit can carry out operator identification, increasing confidentiality and immunity, reducing error rate and making the equipment work more stably and reliably. This circuit has been applied to many domestic products for a long time and the decoding device is relatively easy to buy. Therefore, this kind of device can still be cracked by the professional and technical persons, which leads to poor security.

The power supply of traditional electric locks contains daily AC power supply and a battery installed on the door. The wires of AC power supply used for a long time will be worn and torn, which may cause short circuit or open circuit. For the battery, the door will not be opened when the electricity runs out. So the emergency key must be prepared with a lot of security risks.

Therefore, an anti-theft lock with wide applications, higher security and more convenience is urgently in need.

SUMMARY

The purpose of this invention is to provide a contact laser encoding anti-theft lock. This anti-theft locking device can be widely applied in the fields of daily life and production, with high security and relatively low cost.

The contact laser encoding anti-theft lock of this invention comprises: a key for generating a set of light signals with different pulse repetition frequencies; a signal processing module for receiving a set of optical pulse signals, in which the optical signals are converted to a set of voltage signals at different voltage values, and the voltage signals are compared with a predetermined voltage (the voltage signals within the predetermined voltage range can be output as usual otherwise the output voltage is set to be zero); an electrically controlled lock, for opening or locking anti-theft doors according to the output voltage from the signal processing module; and a power supply for the signal processing module and the electrically controlled lock.

Preferably, the key comprises a built-in power supply, pulse generating circuit and the laser diode group.

Preferably, the pulse generating circuit uses the multivibrator to directly generate a set of electrical pulses with different repetition frequencies, or uses the Schmitt trigger and monoflop as a substitute to produce a set of electrical pulse signals with different repetition frequencies.

Preferably, the laser diode group is a laser diode array. It is used to convert the set of electrical pulse signals with different frequencies into a corresponding set of optical pulse signals. Or the laser diode is a laser diode array with a plurality of different wavelengths. It is used to convert the set of electrical pulse signals with different repetition frequencies to corresponding optical pulse signals with different repetition frequencies and wavelengths.

Preferably, the signal processing module comprises: a photodiode group for the optical pulse signals conversion to an electrical pulse signals; a pulse shaping circuit group for discriminating the pulse-intensity-eligible electrical pulse signals and for doing the pulse shaping; a frequency voltage converting circuit, for the conversion of the shaped electrical pulse signals to voltage signals; a voltage comparator group, for discriminating whether the voltage signal is within the predetermined voltage range; and a AND gate circuit for determining whether all the voltage signals are eligible.

Preferably, the photodiode group is locates adjacent to the laser diode array with multiple response center wavelengths, i.e. next to the laser diode array without any intervening functional components. It is used to convert a set of optical pulse signals to a set of electrical pulse signals mentioned above.

Preferably, each detecting head in the photodiode group has a narrow-band bandpass filter with a center wavelength corresponding to laser diodes mentioned above.

Preferably, the signal processing module further comprises a protection circuit for the power supply turn-off in case of the incident highlight. The protection circuit comprises a broadband photodiode and a signal discrimination circuit. The broadband photodiode detects the background scattering signal of the optical pulses from the key, and send it to the signal discrimination circuit, in which the scattering signal is compared with a predetermined electrical discrimination level to output the signal controlling the power supply switch.

Preferably, the key has a trigger point, and the signal processing module accordingly has a power supply trigger switch. When the key is inserted into an anti-theft locking socket, the trigger point contacts the power supply trigger switch to provide electricity to the signal processing module and the electrically controlled lock.

Preferably, the key has a contact wire, and the signal processing module correspondingly has a power supply switch wire and contact joint which can be connected to the contact wire mentioned above. The other end of the contact wires lays the other side of the key. If the power supply or battery power runs low, an emergency power supply can be used for the signal processing module and the electrically controlled lock via the other side of the key.

Contact laser encoding anti-theft lock of this invention has the following advantages over the conventional anti-theft devices:

1. The contact laser encoding anti-theft lock of this invention has a higher security described as follows:
   a. To meet the repetition frequency conditions. Only when all the repetition frequencies of the laser diode in laser diode group are in line with the conditions set in advance in the signal processing module will the converted voltage be eligible to open the lock. Thus the duplicability of the key is drastically diminished and the security of the contact laser encoding lock is greatly improved.
   b. To meet the laser intensity conditions. Due to the protection circuit, only when the intensities of all the laser diodes in the group are eligible, the electrical pulse signal can be recognized and the subsequent frequency voltage converting circuit can work properly. If high light of other keys is incident, the protection circuit will work, so as to further improve the security of anti-theft lock;
   c. To get the consistent mechanical position. Only when the position of the is consistent with the photodiode array and so as the power supply trigger switch with the corresponding trigger point of the key, the anti-theft lock will work. Therefore the security of anti-theft lock is further improved;
   d. To meet the wavelength condition. Only when the laser wavelengths of all the laser diodes in the group are all qualified, the generated electrical signal will be eligible. When the wavelengths are not consistent, a strong light can meet this condition. At the same time, the protection circuit starts to play a role, thus further improving the security.

2. This invention uses the contact between the key and the signal processing module as a working method, so that when the power supply runs out or when the battery is low, the key can provide electricity to reduce the risk of the emergency key.

3. This invention uses the power supply contact method, which contributes to the reduction of power consumption, frequency replacement of the power supply and costs.

4. The key of this invention adopts integrated circuits with smaller size, easy operation and good portability. Moreover, it can be used as a laser pointer for indication purposes.

5. By adjusting the parameters of the components in the signal generating circuit group, such as the sizes of resistors and capacitors, the key of this invention can freely change the repetition rate and laser intensity. It can be also regularly or irregularly changes the laser encoding to increase the flexibility and security.

FIGURES

DETAILED DESCRIPTION OF THE INVENTION

A further detailed description of this invention will be given with drawings and embodiments of this invention, whereas this should not limit the scope of this invention.

Figure 1:
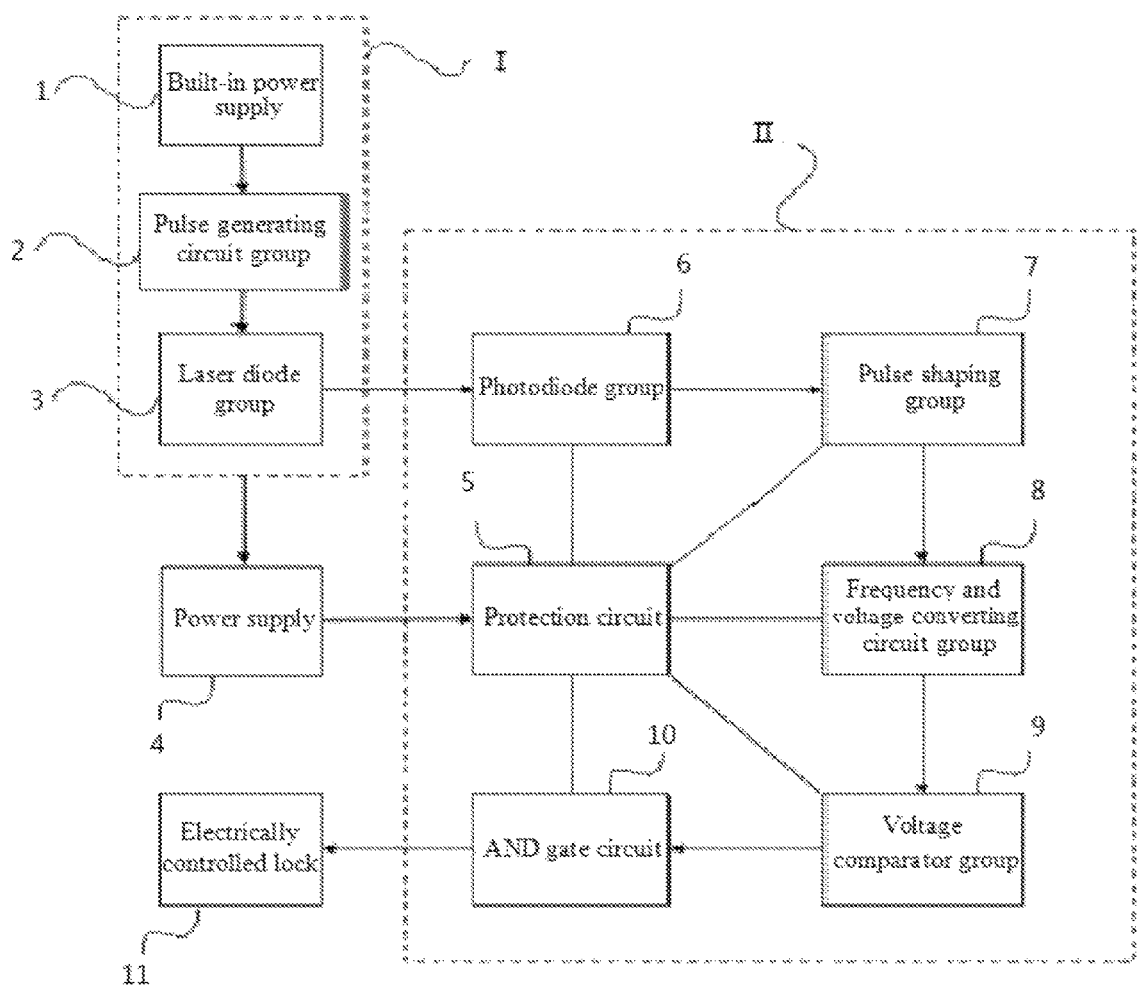
FIG. 1 is a schematic diagram of a preferred embodiment of the contact laser encoding anti-theft lock.
Figure 2:
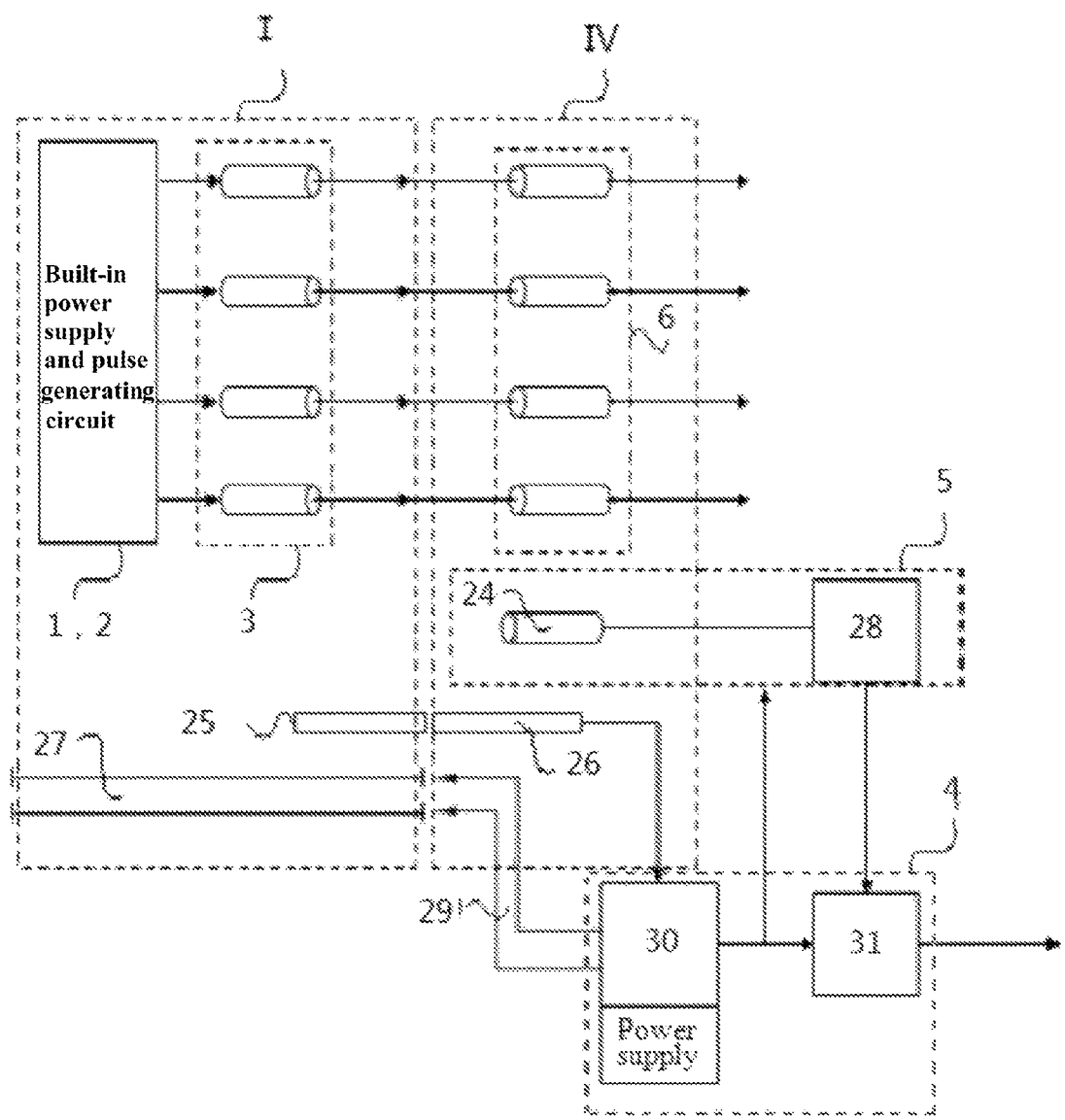
FIG. 2 is a schematic diagram of the preferred embodiment of the key and the signal processing module of the contact laser encoding anti-theft lock.
Figure 3:
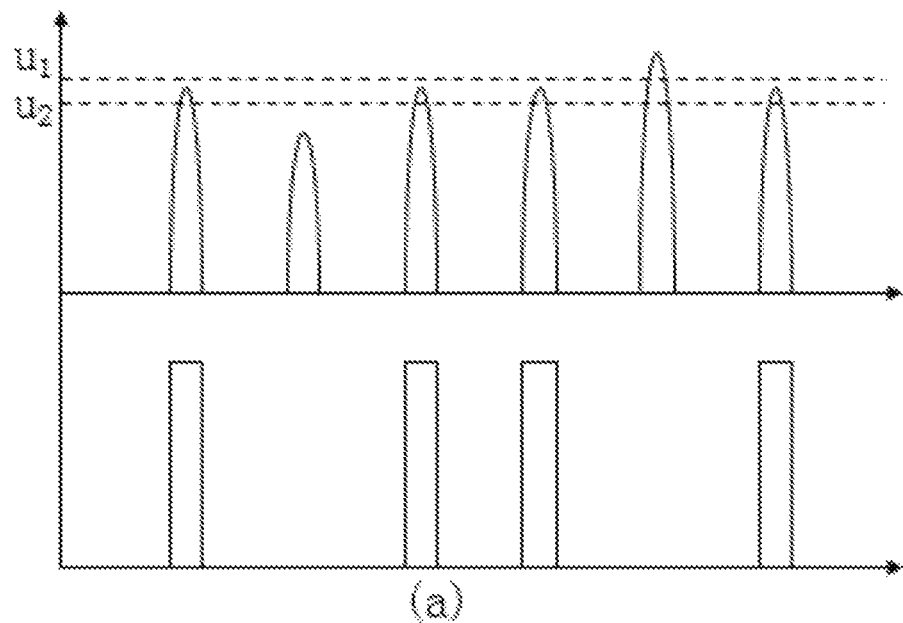
FIG. 3 is a schematic diagram showing a pulse shaped circuit (a) and protection circuit (b) of the preferred embodiment of the contact laser encoding anti-theft lock.
Figure 3:
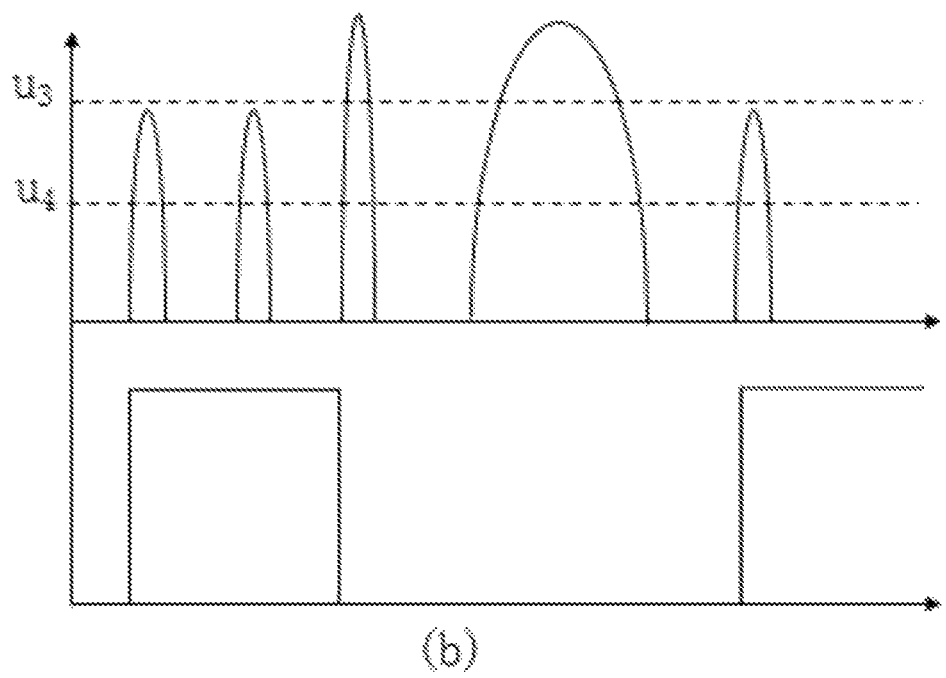

FIG. 1 is a schematic structural view of a preferred embodiment of the contact laser encoding anti-theft lock. FIG. 2 is a schematic diagram of the contact portion of a preferred embodiment of the key and the signal processing modules of the contact laser encoding anti-theft lock. FIG. 3 shows working schematic diagrams of the preferred embodiment of the pulse shaping circuit (a) and the protection circuit (b) of the contact laser encoding anti-theft lock.

This anti-theft lock shown in FIG. 1 includes: key I, for generating a set of optical pulse signals with different frequencies; signal processing module II, receiving a set of optical pulse signals, in which the optical signals are converted to a set of voltage signals at different voltage values, and for comparing the voltage signals with a predetermined voltage (the voltage signals within the predetermined voltage range can be output as usual otherwise the output voltage is set to be zero); electrically controlled lock 11, for opening or locking the anti-theft door according to the output voltage signals from the signal processing module; and a power supply 4, for the signal processing module and the electrically controlled lock.

Key I comprises a built-in power supply 1, a pulse generating circuit group 2 and the laser diode group 3. Pulse generating circuit group 2 utilizes multivibrator to generate a set of electrical signals with different pulse repetition frequencies, or the Schmitt trigger and monoflop can be used as a substitute to produce a set of electrical pulse signals with different repetition frequencies. Laser diode group 3 is a laser diode array; it is used to convert the set of electrical pulse signals with different frequencies to a corresponding set of optical pulse signals. Or the laser diode is a laser diode array with a plurality of different wavelengths. It is used to convert the set of electrical pulse signals with different repetition frequencies to corresponding optical pulse signals with different repetition frequencies and wavelengths. For another embodiment, built-in power supply 1 and pulse generating circuit group 2 can be integrated in a single module (FIG. 2). Since the key can be realized via an integrated circuit, it is smaller and portable.

The signal processing module II includes a photodiode group 6, a pulse shaping circuit 7, a frequency voltage conversion circuit group 8, voltage comparator group 9, and the AND gate circuit 10.

Photodiode group 6 is used to convert the (a plurality of) optical pulse signals (repetition frequency is F1, F2, F3 . . . ) from laser diode group 3 of key I respectively into a set (s) of electrical pulse signals; pulse shaping circuit group 7 is used for discriminating the intensities of electrical pulse signals and then shaping the eligible ones; frequency voltage conversion circuit group 8 is used to convert the shaped electrical pulse frequency signals to the corresponding voltage signals (voltage value is V1, V2, V3 . . . ); voltage comparator group 9 is used for determining whether each of the corresponding voltage signals is within the predetermined voltage range; and AND gate circuit 10 for discriminating whether all the voltage signals are eligible.

Photodiode group 6 is a photodiode array with multiple central response wavelengths and a location corresponding to the laser diode group 3. It is used to convert a set of optical pulse signals respectively to a set of electrical pulses. Further, each photodiode detecting head can have a narrowband bandpass filter whose center wavelength is consistent with its corresponding laser diode (not shown in figure). The effects of the bandpass filter will be described in detail below.

Pulse shaping circuit group 7 is used to do the discrimination and shaping of the electrical pulse signals. u1 in FIG.

3 (a) is the high discrimination level in pulse shaping circuit 7 and u2 is the low level. When the amplitude of the electrical pulse signal is between the high level u1 and low level u2, regular rectangular pulse signal can be obtained. Otherwise, the rectangular pulse signal cannot be output.

For the predetermined voltage range of voltage comparator group 9, the high level and the low level can be set based on the different voltage values mentioned above. The range of the comparison voltage between the high and low level should be as small as possible in order to improve the security of the anti-theft lock. For example, if the repetition frequency of an optical pulse signal from the corresponding key is F1=5.5 KHz and the voltage value is V1=5.5 V, then the high and low voltage level of the comparator can be set respectively 5.6 V and 5.4 V. When another key is inserted, if the corresponding repetition frequency is not in the range of 5.4 KHz to 5.6 KHz, then the converted voltage value will not be between 5.6 V and 5.4 V, and the voltage comparator will not will not output the working voltage for the electrically controlled lock 11. Although the laser signal from each path in discrimination has tiny fault-tolerant range, as the parallel use of laser signals in this invention, it is sufficient to ensure the contact laser encoding anti-theft lock has high security and the key is difficult to be duplicated.

Thus, as described above, key I is used to generate a set of laser pulse signals of different repetition frequencies and the signal processing module II receives and converts the laser pulse signals to voltage signals at different voltage values. Then each voltage signal is compared with the predetermined voltage range. Only when all the voltage signals meet the conditions, the working voltage will be output to open the electrically controlled lock 11. Therefore, only when all the laser pulses generated by the key meet the pre-conditions of the repetition frequency (or they have the correct repetition frequency), the electrically controlled lock will be unlocked. It largely reduces the risk of key duplication and greatly improves the security of the anti-theft lock of this invention.

Further, as shown in FIG. 1, the signal processing module II also includes a protection circuit 5 for the stop of signal processing module II when incident high light turns off the power supply 4. Within the intensity scope of protection circuit 5, pulse shaping circuit 7 of signal processing module II, a frequency-voltage conversion circuit group 8, voltage comparator group 9 and AND gate circuit 10 work in their normal operating voltages. In another embodiment (not shown), signal processing module II can exclude protection circuit 5, but the effect of laser encoding anti-theft of this invention still remain.

Referring again to FIG. 2, protection circuit 5 specifically includes wideband photodiode 24 and signal discrimination circuit 28. Background scattering signal of the light pulses from key I is detected by broadband photodiode 24 and it is sent into signal discrimination circuit 28. The output of signal discrimination circuit 28 is sent to control switch 31 of the power supply protection circuit to turn the switch on and off.

u3 and u4 in FIG. 3 (b) are signal discrimination levels for discrimination circuit 28 in the protected circuit 5. When broadband photodiode 24 detects scattering signal whose intensity is less than u3 and greater than u4, the protection circuit will output high voltage level to trigger control switch 31 of the power supply protection circuit. Then anti-theft lock works. Reversely, when the broadband photodiode 24 detects the scattering signal whose intensity is greater than discrimination level u3, the protection circuit will output low voltage level to make control switch 31 of the power supply protection circuit open. Thus, the anti-theft lock stops working.

For example, with the insertion of a mismatched key, if the intensity or intensities of one or a few of the laser diode group in FIG. 2 is or are too strong, then the scattering light of the laser is relatively strong, the pulse signal detected by broadband photodiode 24 will be relatively strong. As shown in FIG. 3 (b), when the intensity of the scattering signal detected by broadband photodiode 24 is higher than discrimination level u3, the protection circuit will output low voltage level to open control switch 31 of the power supply protection circuit. Then the anti-theft lock will be power off and stop working. This mechanism protects the system from high light. Reversely, if the scattering light of laser diode group 3 in FIG. 2 is lower than the predetermined value of the intensity of pulse signal, the power supply will work well. At the same time, when the output electrical pulse signals of photodiode group 6 (as shown in FIG. 3 (a), u1 is the discrimination high level of pulse shaping circuit and u2 is the low level) is between u1 and u2, a regular rectangular pulse signal will be output, otherwise, no rectangular pulse signal.

As described above, by setting protection circuit 5, it can further improve the security of the contact laser encoding anti-theft lock and make the duplication of the key more difficult.

In addition, as mentioned before, the narrowband bandpass filters corresponding to laser wavelengths of the laser diodes can be installed to the photodiodes of photodiode group. After mismatch of the key, if the laser wavelength(s) of one or a few laser diode is or are not inconsistent with the passing wavelength(s) of narrowband bandpass filter(s) of the photodiode(s), the laser transmittance will become lower, and the detection efficiency of the region outside the center wavelength will decrease significantly, which makes the detection signal of the photodiode low, and causes the disability of pulse shaping circuit to detect any signal. On the other hand, if a mismatched key forces to increase the laser intensity of the laser diode array, background scattering signals will be enhanced to make the protection circuit output low. As a result, anti-theft lock will be power off and stop working. Thus, the wavelength matching between laser diode array and the photodiode array can also further improve the security of the anti-theft lock.

Besides the built-in power supply, pulse generating circuit group 1 and 2, and laser diode group 3, key I in FIG. 2 comprises trigger point 25 and contact wire 27. The contact portion of signal processing module II and key I, IV in FIG. 2, includes: photodiode group 6, which is corresponding to laser diode group 3 in mechanical position, wideband photodiode 24 composing protection circuit 5, signal discrimination circuit 28, and signal processing module power supply trigger switch 26. In addition to the above-mentioned key I and the contact portion IV of signal processing module, the power supply wire switch of the contact portion, contact connector 29, power supply switch 30, and control switch 31 of the power supply protection circuit are also shown in the figure.

Trigger point 25 in key I and power supply trigger switch 26 of signal processing are set correspondingly to each other. When key I is inserted into the keyhole, point 25 contact trigger 26, power supply switch 30 will be triggered to make power supply 4 provide electricity to the signal processing module II and electrically controlled lock 11. Lock 11 could be magnetic or electric. Power supply 4 is a DC battery. In addition, photodiode group 6 is corresponding to laser diode group 3.

Security of the anti-theft locks can be further improved by setting the mechanical position mentioned above. First, if the trigger point 25 is not corresponding to power supply trigger switch 26 of the signal processing module, the power supply of the processing module cannot be triggered, so the lock will not be open. Second, if the positions of the laser diode array of laser diode 22 and photodiode group 23 do not match each other, on the one hand, signal degradation will occur, thereby the pulse shaping circuit can't detect the signals; on the other hand, if the mismatched key forces to increase the laser intensity of the laser diode array, the background scattering signal will increase to make the protection circuit output a low level, where the anti-theft lock is power off and stops working. Thus, strict matching of the mechanical position further enhances the security of the anti-theft lock.

Further, since this invention is a contact laser encoding anti-theft lock, the energy saving purpose can be achieved by the contact of trigger point 25 to trigger switch 26 to turn on the power supply. For key of the contact laser encoding anti-theft lock, in the normal vacant state, the built-in power supply 1 and pulse generating circuit 2 in FIG. 1 are open for energy saving. When the key is inserted into the keyhole, press the micro switch (not shown), built-in power supply 1 and the pulse generating circuit 2 is turned on, the key begins to work. For the signal processing module, similarly, when key I is not inserted into the keyhole, signal processing module II in FIG. 2 will be power-off; when key I is inserted into the keyhole, trigger point 25 will contact power supply trigger switch 26 of the signal processing module to turn on the power supply switch. After key I leaving the lock, the trigger point 25 will not contact the power supply trigger switch 26 of the signal processing module to make the power supply switch off. Thus, whether the key or the signal processing module, it will be power-off when not used, which can greatly reduce the power consumption to achieve the purpose of saving energy.

Further, as shown in FIG. 2, one end of contact wire 27 in key I contacts the power supply switch wire of the contact portion IV of the signal processing module and the contact connector 29 correspondingly. The other end of the wire 27 is on the other side of key I. If the power supply 4 runs out or the battery power is low, an emergency power supply can be connected on the other side of the key I.

Specifically, when the power supply of the signal processing module runs low, trigger point 25 of the key can be removed firstly (trigger point 25 can be designed to be detachable), so power supply switch 30 will not be triggered. The power supply switch wire and one end of contact connector 29 is connects to the side of power supply switch 30 far away from the power supply. The other end is a contact interface, which can be connected with the contact wire 27. When key I is inserted into the lock, one end of contact wire 27 will connect to one end of contact connector 29 with the other end of it locating on the other side of the key. With the power supply of the corresponding voltage level, anti-theft lock can work normally. After the lock opened, the anti-theft locking device can be unlocked inside the security door for the replacement of the power supply. The whole process is simple and it excludes the potential security problems caused by the emergency key. It also further improves the security of the anti-theft lock of this invention.

In addition, when the power supply of the key of contact laser encoding anti-theft lock is low, a battery replacement can be done after direct remove of built-in power supply.

The working process of the contact laser encoding anti-theft lock embodiment will be illustrated with FIGS. 1 and 2. When the corresponding key I is inserted into the keyhole, trigger point 25 of key I on the signal will contact power supply trigger switch 26 of the signal processing module to make power supply 4 of signal processing module II work. As the button on key I pressed, built-in power supply 1 of the key provides electricity to the pulse generating circuit group 2 to generating a set of electrical signals with different pulse repetition frequencies. These electrical pulse signals are input into laser diode group 3 (a laser diode array with a plurality of different wavelengths) to generate a set of light pulses with different repetition frequencies and wavelengths. Each of the light pulses with different repetition frequencies enters its corresponding photodiode 6 for the conversion to a plurality of electrical pulses. Via pulse shaping circuit group 7, the plurality of electrical pulse signals are shaped as a series of regular rectangular pulse signals. These pulse frequency signals are converted to a set voltage signals by frequency-voltage conversion circuit 8. Then in voltage comparator 9, the voltage signals are compared with a predetermined voltage. If they meet the conditions, the output will be the working voltage of electrically controlled lock 11. Otherwise the output voltage will be zero. After that, these voltage signals enter AND gate circuit 10. If the output signals of the comparator group 9 are all operating voltages, gate 10 will also output operating voltages to drive electrically controlled lock 11 open. Or else, as long as one of the output signals of voltage comparator group 9 is not operating voltage, the output voltage will be zero and electrically controlled lock 11 will remain locked.

It should be noted that the contact laser encoding anti-theft lock needs adjustment after the initial installation. That is encryption and decryption. To do the encryption is to determine the repetition frequency and laser intensity of each laser diode of laser diode group. Then to do the decryption is to set the discrimination levels of the pulse shaping circuit and the protection circuit according to the signal intensity of each wideband photodiodes in the group, and to set the comparison voltage of the voltage comparator according to the output value of the frequency voltage convertor circuit to ensure the output voltage of the convertor circuit is within the tiny range predetermined by the comparator.

The above-described preferred embodiment is only an example of this invention. It is not used to limit the scope of this invention. Anyone who has general knowledge in the technical field can make various changes and modifications within the scope of this invention. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. All references cited herein are incorporated by reference in their entirety.

What is claimed is:

1. A contact laser encoding anti-theft lock comprising:
a key for generating a set of optical pulse signals with different pulse repetition frequencies, wherein the key comprises a laser diode group having a plurality of laser diodes, and wherein each of the laser diodes of the laser diode group can produce an optical pulse signal having a different repetition frequency;
a signal processing module for receiving the set of optical pulse signals, wherein the optical pulse signals are converted to a set of electric pulse signals corresponding to a set of voltage signals at different voltage values, wherein the voltage signals are compared with a predetermined voltage range, and wherein the signal processing module can output voltage signals within the predetermined voltage range or can output a voltage of zero volts;
an electrically controlled lock for opening or locking anti-theft doors according to the output voltage from the signal processing module; and
a power supply for the signal processing module and the electrically controlled lock,
wherein the signal processing module further comprises a protection circuit which turns off the power supply in response to incident light, the protection circuit further comprising a broadband photodiode and a signal discrimination circuit, wherein the broadband photodiode is used to detect a background scattering signal of the optical pulse signals from the key and send the background scattering signal to the signal discrimination circuit, and wherein the signal discrimination circuit is used to compare the background scattering signal with a predetermined electrical discrimination level to output the signal controlling the power supply.

2. The contact laser encoding anti-theft lock according to claim 1, wherein the key comprises a built-in power supply and a pulse generating circuit group.

3. The contact laser encoding anti-theft lock according to claim 2, wherein the pulse generating circuit generates a set of electrical pulse signals with different repetition frequencies using either a multivibrator or a Schmitt trigger and monoflop.

4. The contact laser encoding anti-theft lock according to claim 3, wherein the laser diode group is selected from the group consisting of
a laser diode array for converting the set of electrical pulse signals with different frequencies to a corresponding set of optical pulse signals and
a laser diode array with a plurality of different wavelengths for converting the set of electrical pulse signals with different repetition frequencies to corresponding optical pulse signals with different repetition frequencies and wavelengths.

5. The contact laser encoding anti-theft lock according to claim 4, wherein the signal processing module comprises:
a photodiode group for converting the optical pulse signals to electrical pulse signals;
a pulse shaping circuit group for discriminating the pulse-intensity-eligible electrical pulse signals and for doing the pulse shaping;
a frequency voltage converting circuit for the conversion of the shaped electrical pulse signals to voltage signals;
a voltage comparator group, for discriminating whether the voltage signal is within the predetermined voltage range; and
a AND gate circuit for determining whether all the voltage signals are eligible to open the lock.

6. The contact laser encoding anti-theft lock according to claim 5, wherein the photodiode group is located adjacent to the laser diode group.

7. The contact laser encoding anti-theft lock according to claim 6, wherein each detecting head in the photodiode group has a narrow-band bandpass filter with a center wavelength corresponding to the laser diodes.

8. The contact laser encoding anti-theft lock according to claim 1, wherein the key has a trigger point, and the signal processing module accordingly has a power supply trigger switch, wherein when the key is inserted into an anti-theft locking socket, the trigger point contacts the power supply trigger switch to provide electricity to the signal processing module and the electrically controlled lock.

9. The contact laser encoding anti-theft lock according to claim 1, wherein the key has a contact wire, and the signal processing module correspondingly has power supply switch wires and a contact joint which can be connected to a first end of the contact wire, wherein the second end of the contact wire is located on a side of the key away from the signal processing module, such that if the power supply or battery power runs low, an emergency power supply can be provided through the contact wire and used for the signal processing module and the electrically controlled lock.

10. The contact laser encoding anti-theft lock according to claim 1, further comprising a photodiode group for converting the optical pulse signals to electrical pulse signals, the photodiode group comprising a photodiode for each laser diode of the laser diode group.

* * * * *